Patented May 30, 1950

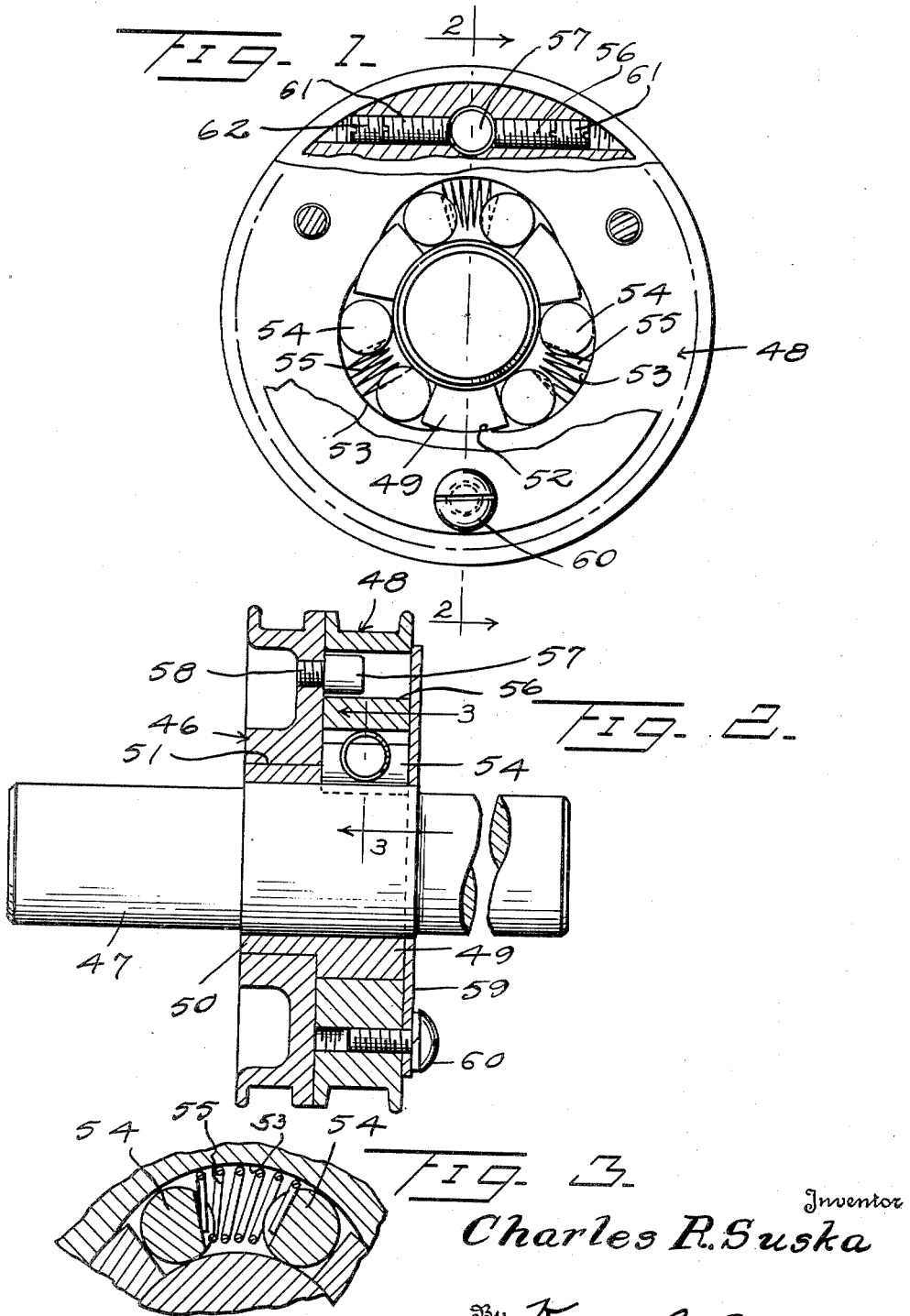

2,509,541

UNITED STATES PATENT OFFICE 2,509,541

LOST MOTION ADJUSTMENT FOR DRIVE RELEASE COUPLINGS

Charles R. Suska, Corry, Pa., assignor to Aero Supply Mfg. Co. Inc., Corry, Pa.

Application March 5, 1948, Serial No. 13,217

1 Claim. (Cl. 192—8)

This invention relates to self-locking couplings.

An object of this invention is to provide a coupling between a driving member and a driven member which is so constructed and arranged that the driving member can rotate the driven member in either direction, and the driven member is locked against independent rotation with respect to the driving member and against the application of a rotative force from the driven member to the driving member.

Another object of this invention is to provide a coupling between driving and driven members wherein these members have limited rotary movement relative to each other, and the coupling members are locked together by means of pairs of spring-pressed locking elements.

In at least one application of this invention, the coupling members are enclosed in a housing which is fixedly secured against rotation and the locking elements bear against the housing so that the driven member is locked against rotation by any torque force which may be applied to the driven member.

In the drawings,

Figure 1 is a detailed end elevation, partly broken away, and in section, of a coupling constructed according to an embodiment of this invention, Figure 2 is a sectional view taken on the line 2—2 of Figure 1, Figure 3 is a fragmentary sectional view taken on the line 3—3 of Figure 2.

Referring to the drawing there is disclosed an embodiment of this invention wherein the coupling means is associated with a pair of end abutting pulleys. A driving pulley 46 is rotatably mounted on a stationary shaft 47. A driven pulley 48 is disposed in face or end abutting relation with respect to the driving pulley 46 and is also rotatable relative to the stationary shaft 47. The driving pulley 46 has extending therefrom a plurality of clutch releasing fingers 49 which extend from an annular bushing 50 which is adapted to be fixedly secured in any suitable manner within the bore 51 of the driving pulley 46. The driven pulley 48 is formed with a bore 52 within which the fingers 49 rotatably engage and the bore 52 of the driven pulley 48 is also formed with a plurality of spaced cam surfaces 53. Pairs of wedging or clutching rollers 54 which are spring-pressed by means of a spring 55 are disposed in the space between the cam surfaces 53 and the shaft 47. These wedging members are constantly urged to wedging position so as to thereby lock the driven member 48 against rotation in either direction except when the driven member 48 is under the torque force of the driving member 46 at which time the fingers 49 will move certain ones of the wedging or clutching members 54 to released position.

The driven member 48 is provided outwardly of the bore 52 thereof with an opening 56 within which a driving pin 57, threaded as at 58, loosely engages. The pin 57 provides for positive operative coupling between the driving and driven pulleys and the pin 57 is sufficiently loose in the opening 56 so that before the pin 57 engages the wall of the opening 56, one series of wedging rollers 54 will be moved by the releasing fingers 49 to released position.

A retaining plate 59 is secured by fastening members 60 to the driven member 48 and provides for retaining the wedging members 54 in operative position between the driven member 48 and the stationary shaft 47.

The driven member 48 has threaded thereinto a pair of opposed adjusting screws 61 which are locked by lock screws 62. The screws 61 provide a means whereby the clearance between the driving and driven members can be very finely and accurately adjusted. The screws 61 also function as a wear take-up, so that wear between the wedging rollers 54 and the cam surfaces 53, or wear of pin 57 may be taken up at intervals to maintain the accurate adjustment of the movable parts.

The pin 57 constituting a driving pin which is carried by the driving member 46 will provide the positive driving connection between the driving and driven members. This driving connection is a loose connection which will provide for slight rotary movement of the driving member 46 relative to the driven member 48. This slight rotary movement is only sufficient to provide for engagement of the fingers 49 with certain ones of the wedging members 54 to move these members to released or unlocked position.

When the driven member 48 is under independent torque, this force will cause the wedging members 54 to tightly lock the driven and stationary members together. Any torque force on the driven member will therefore not be transmitted to the driving member.

With a coupling as hereinbefore described, the driving member can rotate the driven member in either direction, but the driven member is locked against independent rotation with respect to the driving member and the driven member is incapable of rotating the driving member due to the locking of the driven member with respect to the stationary support.

While I have shown this invention applied to a pulley, it will be understood that the invention can readily be applied to other machine elements, such as gears, sprockets and the like, and the terms "driving" and "driven" elements as used in the claims are defined as covering pulleys, gears, sprockets and the like.

I do not mean to confine myself to the exact details of construction herein disclosed, but claim all variations falling within the purview of the appended claim.

What I claim is:

A coupling comprising a stationary shaft, a driving member rotatable on said shaft, a driven member disposed in face abutting relation with respect to said driving member, said driven member having an opening therethrough, a driving pin carried by said driving member extending loosely into said opening whereby to provide limited movement between said members, said driven members having spaced cam surfaces, pairs of spring-pressed wedging members disposed between said cam surfaces and said shaft, releasing fingers fixed relative to said driving member and engaging between said driven member and said shaft whereby to release certain ones of said wedging members under application of a driving force from said driving member, a pair of opposed threaded adjusting screws carried by said driven member for regulating the relative movement between said pulleys, and a lock screw for each of said pair of screws.

CHARLES R. SUSKA.

REFERENCES CITED

The following references are of record in the file of this patent:

UNITED STATES PATENTS

| Number | Name | Date |
|---|---|---|
| 222,455 | Chambers | Dec. 9, 1879 |
| 1,285,153 | Hauser | Nov. 19, 1918 |
| 1,471,398 | Inglis | Oct. 23, 1923 |
| 1,834,440 | Whitney | Dec. 1, 1931 |
| 2,076,828 | Swartz | Apr. 13, 1937 |
| 2,300,023 | Swartz | Oct. 27, 1942 |
| 2,380,774 | Maitland | July 31, 1945 |
| 2,429,900 | Spraragen | Oct. 28, 1947 |